June 14, 1927. J. S. ANDREWS Re. 16,657

WALL FURNACE

Original Filed June 29, 1925

INVENTOR.

John S. Andrews

Reissued June 14, 1927.

Re. 16,657

UNITED STATES PATENT OFFICE.

JOHN S. ANDREWS, OF LOS ANGELES, CALIFORNIA.

WALL FURNACE.

Original No. 1,582,657, dated April 27, 1926, Serial No. 40,181, filed June 29, 1925. Application for reissue filed June 21, 1926. Serial No. 117,577.

My invention relates generally to improvements in household heating appliances and in particular to a wall heater or furnace, the principal objects of my invention being to generally improve upon and simplify the construction of the existing forms of gas burning wall heaters, to provide a heater that is self-contained or of unitary structure, thereby permitting its ready installation in the wall of a building, and further to provide a wall heater of the character referred to that presents a neat and finished appearance and which will be very effective in performing its intended functions.

Further objects of my invention are to construct the wall heater so that the cooler air from the lower portion of the room in which the heater is located and fresh air admitted through an opening in the floor above which the heater is located will be caused to circulate through the furnace and be heated therein and in such heated condition be discharged from openings in the upper portion of the furnace housing.

Further, to provide a heater wherein gas heated radiant members and a reflector are utilized for throwing heat outwardly into the room in which the apparatus is located, and further to construct the furnace or heater so as to practically eliminate fire hazards.

A further object of my invention is to provide a heater, of the class described, having novel means of continuously supplying fresh warm air to the room.

A further object is to provide a heater, of the class mentioned, whereby the cooler air, from the lower portion of the room in which the heater is located, is heated or re-heated by impingement against heated walls enclosing the back side of the heating means, and whereby cold, fresh air is initially heated by passing through a slightly heated space positioned at the inner or back side of the heater.

A still further object is to provide a heater in which a portion of the gases of combustion from the heating means is continuously directed from the room.

A still further object of my invention is to provide a heater, of the class described, in which the several parts are simply and economically constructed, and whereby fuel consumption will be reduced to a minimum commensurate with heating capacity and efficient fresh air ventilation.

With the foregoing and other objects in view, my invention consists in certain novel features of construction and arrangement of parts that will hereinafter be more fully described and claimed and illustrated in the accompanying drawing, in which Fig. 1 is a front elevational view of a wall furnace or heater of my improved construction.

Figure 1:
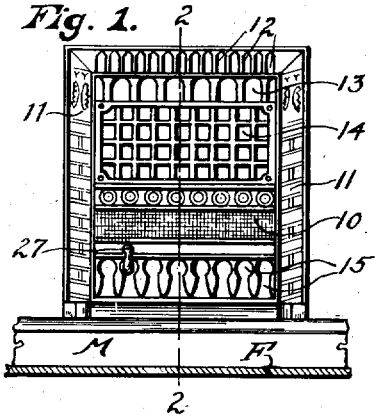
Figure 2:
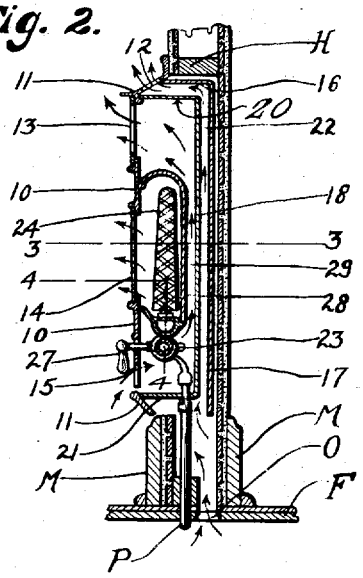
Fig. 2 is an enlarged vertical section taken approximately on the line 2—2 of Fig. 1.
Figure 4:
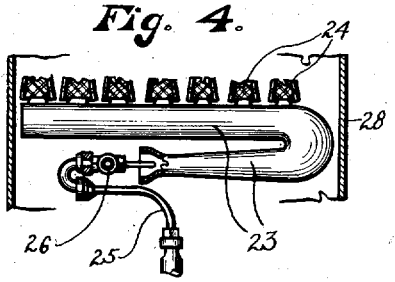
Fig. 4 is a vertical section taken approximately on the line 4—4 of Fig. 2.
Figure 3:
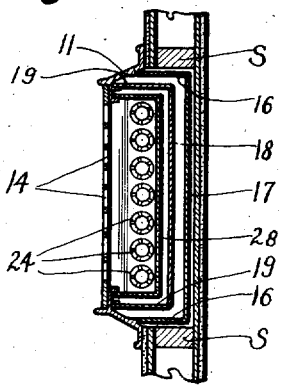
Fig. 3 is a horizontal section taken on the line 3—3 of Fig. 2.
Figure 6:
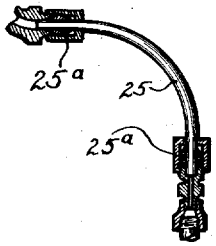
Fig. 6 is an elevational view partly in section of the flexible metal tube that forms a connection between the gaseous fuel supply pipe and the burner of my improved heater.

In preparing a space or chamber in a wall for the reception of my improved heater, it is only necessary to arrange a header H, preferably a "two by four", between a pair of wall studs S and to form an air inlet opening O in the floor F beneath the space or chamber. The usual mopboards M are arranged on the wall in a convenient manner and a gas supply pipe P is brought through the floor or through the opening O into the lower portion of the furnace receiving chamber.

The furnace or heater, which is selfcontained or of unitary structure in order that it may be installed as a complete unit in the wall pocket or chamber, comprises an outer wall or plate 10, preferably of cast metal and having inclined flanges such as 11 on its sides, top and bottom and the edges of which flanges are adapted to bear against the surface of the wall and pocket or chamber therein.

Formed in the inclined flange 11 at the top of the wall or panel 10 is a series of heated fresh air outlets 12 and formed in the wall or panel immediately below these openings is a second series of heated air outlet openings 13. A third set of openings such as 14 is formed in the wall or panel 10 below the openings 13 and at the lower portion of said wall or panel is formed a fourth set of openings 15 which are for the admission of cool air from the bottom of the room into the lower portion of the heater.

Secured to the rear side of wall or panel 10 are the forward edges of flanges 16 that extend forwardly from the top and side edges of a rear wall 17. This wall and its flanges are preferably of suitable sheet metal that is covered or coated with asbestos or analogous fire-proof material. Wall 17 occupies a position in the rear portion of the wall pocket, while flanges 16 are positioned adjacent to the studs S and header H.

Secured in any suitable manner to the rear side of wall or panel 10 is a box-like member preferably formed of sheet metal and comprising a rear wall 18, side flanges 19, a top flange 20 and a bottom flange 21. This rear wall 18 is spaced a slight distance in front of wall 17 thereby providing a narrow vertically disposed fresh air circulating and heating chamber 22 between said walls 17 and 18, which chamber extends between the side flanges 16 and 19 and the upper end of said heating chamber extends between the upper one of the flanges 16 and the top flange 20 and communicates with the outlet openings 12 in flange 11 at the top of plate 10.

Arranged in the lower portion of the space or chamber within the box-like structure comprising wall 18 and flanges 19, 20 and 21, is a horizontally disposed gaseous fuel burner 23 having suitably formed jet openings in its upper portion and disposed over these jet openings are radiant heating elements 24 that are formed of fire clay or analogous material.

Leading from the upper end of gas supply pipe P upwardly through bottom flange 21 is a connecting duct 25 in which is located a valve 26, and the operating handle 27 for said valve occupies a position directly in front of the lower portion of wall or panel 10.

The radiant heating elements 24 are positioned directly behind the series of openings 14 and arranged behind and above and to the sides of said radiant elements is a wall 28 preferably of metal, the rear portion of which constitutes a reflector to throw heat from the radiant elements forwardly through openings 14. The rear portion of wall 28 is spaced a slight distance in front of wall 18 thereby providing a vertically disposed duct 29 open at its lower end and its upper end communicating directly with the outlet openings 13.

When my improved heater is in operation, the gaseous fuel that issues from the jet orifices of the burner 23 and burns in the radiant elements 24 is admitted to said burner and controlled by proper manipulation of valve handle 27. Direct heat from the radiant elements will be reflected forwardly through openings 14 by the rear portion of wall 28 and comparatively cool air from the lower portion of the room in which the heater is located will, upon entering openings 15 and passing upwardly through duct 29, be heated as a result of its contact with the heated wall 29 and in such heated condition, this air will discharge through openings 13 into the room to circulate upwardly therethrough. Simultaneously fresh air from beneath the floor F will enter opening O and circulate upwardly through duct 22 thereby becoming heated to a certain degree and in such heated condition this heated fresh air will discharge from openings 12 to circulate upwardly through the room in which the heater is located.

Thus the admission of a certain amount of fresh air into and through the heater tends to keep the air fresh and pure in the room in which the heater is located and said fresh air supplying the oxygen that is necessarily consumed in the operation of the gaseous fuel burner 23.

Figure 5:
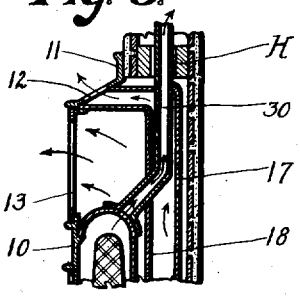
Fig. 5 is a vertical section taken through the upper portion of a modified form of the furnace wherein the burner chamber is provided with a vent.

In the event that it is desirable or necessary to equip the heater with a vent for the purpose of carrying off products of combustion from the gaseous fuel burner, a metal duct such as 30 leads from the upper end of the radiant inclosing wall 28, said duct being carried through the upper portions of walls 17 and 18 and up through header H and the space in the wall above the latter (see Fig. 5). Thus provision is made for carrying off any fumes or noxious gases that might be produced during the operation of the burner.

Tube 25 that forms a connection between the supply pipe P and valve 26 of the burner is preferably formed of copper or similar soft metal in order that it may be readily bent and adjusted to suit variable distances between the supply pipe and burner, and when the heater is being installed.

The ends of this flexible tubing are connected by suitably packed joints 25[a] with the supply pipe P and the return elbow or fitting that is associated with valve 26.

By the use of the flexible tube, much time, labor and consequent expense may be saved in the installation of the heater for, by bending said pipe, the connections may be easily and quickly made without the necessity for careful setting or roughing in of the gas supply pipe.

The flexible tube is furnished with the heater and thus enables the latter to be readily connected for use.

Thus it will be seen that I have provided a relatively simple and practical wall heater which during operation is effective in producing a circulation of warm fresh air through the room in which it is located and the heater being of unitary structure so as to enable it to be readily installed. The construction of the heater is such that it can be readily cleaned and maintained in a sanitary condition and as the burner and radiants associated therewith are practically surrounded by three metal walls, one or more of which may be coated or lined with sheet asbestos or the like, the danger of fire resulting from the use of the heater is eliminated.

It will be understood that minor changes in the size, form and construction of the various parts of my improved wall furnace may be made and substituted for those herein shown and described, without departing from the spirit of the invention, the scope of which is set forth in the appended claims.

I claim as my invention:

1. The combination with a building wall in the lower portion of which is formed a pocket and there being an opening in the floor beneath said wall, which opening communicates with the lower portion of said pocket, of a heating appliance located in said pocket and comprising a face plate, a housing secured to the rear side of said face plate and occupying the rear portion of the space within said pocket the lower end of which housing is open, a second housing arranged on the rear side of the face plate and spaced apart from the first mentioned housing, the lower end of the second mentioned housing being closed, a gaseous fuel burner arranged within the chamber in the lower portion of said second mentioned housing, radiant heating elements disposed above said gaseous fuel burner, and a reflecting housing arranged to the rear of said radiant heating elements.

2. The combination with a building wall in the lower portion of which is formed a pocket and there being an opening in the floor beneath said wall, which opening communicates with the lower portion of said pocket, of a heating appliance located in said pocket and comprising a face plate, a housing secured to the rear side of said face plate and occupying the rear portion of the space within said pocket the lower end of which housing is open, a second housing arranged on the rear side of the face plate and spaced apart from the first mentioned housing, the lower end of the second mentioned housing being closed, a geseous fuel burner arranged within the chamber in the lower portion of said second mentioned housing, radiant heating elements disposed above said gaseous fuel burner, a reflecting housing arranged to the rear of said radiant heating elements and a vent duct leading from the upper end of the housing that incloses said radiant heating elements.

3. The combination with a building wall in the lower portion of which is formed a pocket, there being an opening in the floor beneath said wall, which opening communicates with the lower portion of said pocket and a gas supply pipe entering the lower portion of said pocket, of a heating appliance located in said pocket and comprising a face plate, a housing secured to the rear side of said face plate and occupying the rear portion of the space within said pocket the lower end of which housing is open, a second housing arranged on the rear side of the face plate and spaced apart from the first-mentioned housing, the lower end of the second-mentioned housing being closed, a gaseous fuel burner arranged within the chamber in the lower portion of said second-mentioned housing, radiant heating elements disposed above said gaseous fuel burner, a reflecting housing arranged to the rear of said radiant heating elements and a tube of flexible material connecting the gas supply pipe that enters the lower end of said pocket with said gaseous fuel burner.

4. The combination with a building wall in the lower portion of which is formed a pocket, there being an opening in the floor beneath said wall, which opening communicates with the lower portion of said pocket and a gas supply pipe entering the lower portion of said pocket, of a heating appliance located in said pocket and comprising a face plate, a housing secured to the rear side of said face plate and occupying the rear portion of the space within said pocket the lower end of which housing is open, a second housing arranged on the rear side of the face plate and spaced apart from the first-mentioned housing, the lower end of the second-mentioned housing being closed, a gaseous fuel burner arranged within the chamber in the lower portion of said second-mentioned housing, radiant heating elements disposed above said gaseous fuel burner, a reflecting housing arranged to the rear of said radiant heating elements, a tube of flexible material connecting the gas supply pipe that enters the lower end of said pocket with said gaseous fuel burner and a vent duct leading from the upper end of the housing that incloses said radiant heating elements.

5. In a wall furnace, a heating means, a pair of air channels in said furnace, said channels receiving their air supply from the bottom of the furnace, one air channel being in the direct zone of the heat emanating from said means, and the other channel discharging ventilating air through the upper end of the furnace, and an air exit for the first air channel located below the point of air discharge from the second channel.

6. In a device as described, the combination of a base having an air-receiving port, a wall furnace having a passage communicating with said base port, a heating chamber in said furnace out of communication with said base port and containing a fire box spaced at its rear, top, and side walls from the adjacent walls of said heating chamber to provide an air heating passage, means disposed above said fire box for discharging the heated air from the air heating passage, and a wall extending transversely of said furnace above said means and shaped to provide an air exit for the first mentioned passage.

7. In a wall furnace, a front wall having its uppermost end provided with a transverse series of air ports, a heating chamber below said series of air ports, means allowing for the escape of heated air from said chamber at a point below and in proximity to said air ports, and an air-directing jacket beginning at the lower end of said furnace, communicating with a source of ventilating air, and registering with said air ports for the purpose of discharging ventilating air.

8. In a wall furnace, a front wall having an upper transverse perforated portion for directing air upwardly, a heating chamber built into said furnace with its front wall projecting outwardly of said perforated portion and having a perforated front wall for directing air outwardly, means at the lower end of said furnace for allowing air to pass upwardly into said chamber, and a continuous ventilating chamber at the rear of said heating chamber and having a common dividing partition therebetween, air being introduced into said ventilating chamber from a point below the heating chamber.

9. The combination with a building wall in the lower portion of which is formed a pocket, there being provided an opening in the floor beneath said wall, said opening communicating with the lower portion of said pocket, of a heating appliance located in said pocket, said heating appliance having a face plate, a housing secured to the rear side of said face plate and occupying the rear portion of the space within said pocket, the lower end of said housing being open and communicating with the opening in the floor, the upper portion of said housing communicating with the room in which the heating appliance is located, a heat-reflecting housing arranged within said first housing and spaced therefrom, and heating means positioned within said reflecting housing.

10. The combination with a building wall and the floor of a room, said floor having an opening communicating with cool, fresh air, of a heating appliance in connection with said wall, said appliance having an outer housing communicating at its lower end with the opening in the floor and at its upper end with the interior of the room in which the appliance is located, a heat-reflecting housing arranged within the first housing and spaced therefrom, and a heating means positioned within said reflecting housing, the first housing being separated at its lower portion from said reflecting housing.

11. The combination with a building wall and the floor of a room, said floor having an opening communicating with cool, fresh air, of a heating appliance in connection with said wall, said appliance having an outer housing communicating at its lower end with the opening in the floor and at its upper end with the interior of the room in which the appliance is located, a reflecting housing arranged within the first housing and spaced therefrom, a heating means positioned within said reflecting housing, said reflecting housing communicating with the room, and a vent connected with the upper portion of said reflecting housing and communicating with the atmosphere.

12. In a heater of the class described, an outer housing communicating at its lower end with fresh air and having a room exit port at its upper portion, a second housing positioned within and spaced from said first housing and communicating at its lower and upper ends with the room in which the heater is located, a combustion chamber positioned within and spaced from said second housing and also communicating with the room, and a heating means positioned in said combustion chamber.

13. In a heater of the class described, an outer housing communicating at its lower end with fresh air and having a room exit port at its upper portion, a second housing positioned within and spaced from said first housing and communicating at its lower and upper ends with the room in which the heater is located, a combustion chamber positioned within and spaced from said second housing and also communicating with the room, a heating means positioned in said combustion chamber, and a vent connected with the upper portion of said combustion chamber and extending into the space between the same and the second housing, and also into the space between the second and first housings.

14. In a heater of the class described, the combination with the wall and floor of a room, the floor having an opening communicating with a source of fresh air, a housing in connection with the wall and communicating at its lower end with the opening in the floor and at its upper end with said room, a second housing positioned and spaced from said outer housing and communicating at its lower and upper ends with said room, a combustion chamber positioned within the second housing and also communicating with the room, and a heating means positioned in said combustion chamber.

In witness whereof he has hereunto set his hand this 10th day of June, 1926.

JOHN S. ANDREWS.